United States Patent Office 3,507,641
Patented Apr. 21, 1970

3,507,641
PREPARATION OF SLURRY FERTILIZER BY ACID TREATMENT OF PHOSPHATE ROCK AND AMMONIATION
Alvin Richmond, Baltimore, and Casimer C. Legal, Jr., Elkridge, Md., assignors to W. R. Grace & Co., New York, N.Y., a corporation of Connecticut
No Drawing. Filed Dec. 29, 1966, Ser. No. 605,583
Int. Cl. C05b 11/08, 11/10
U.S. Cl. 71—37                                4 Claims

ABSTRACT OF THE DISCLOSURE

A slurry fertilizer is made by treating phosphate rock with a mixture of sulfuric acid and phosphoric acid, at least a portion of the phosphoric acid being added to the reaction mix prior to the addition of sulfuric acid, the sulfuric acid being 40–50 percent concentration, followed by addition of liquid anhydrous ammonia to a pH in the range of about 5–5.5, to provide a suspension which is sprayable on soil and relatively stable in storage. Preferred embodiments include addition of certain boron compounds and magnesium oxide to further stabilize the suspension.

---

This invention is directed to fertilizers and is particularly applicable to the production of slurry fertilizers by acidulating phosphate rock and neutralizing the acidulate while substantially all of the impurities in the phosphate rock are maintained in the reaction mixture.

It is an object of this invention to provide a new and improved process for producing an ammoniated acidulated phosphate rock slurry fertilizer employing sulfuric acid as the major acidulating agent. It is a further object to provide such a process that does not require costly refining. A still further object of the this invention is to provide such a process that can be used to provide a slurry fertilizer with substantial nitrogen content, a high plant available phosphate content, and a high water soluble phosphate content. It is another object of this invention to provide such a new and improved process for producing slurry fertilizer that can be carried out in stainless steel reaction apparatus even though highly corrosive acids are utilized. It is also an object of this invention to provide a new and improved neutralized, acidulated phosphate rock slurry fertilizer containing all of the impurities introduced with the phosphate rock and having a substantial sulfur content derived from sulfuric acid, a high water soluble phosphate content, a substantial ammoniacal nitrogen content, a high phosphorus analysis and good rheology.

In one preferred embodiment of the invention a process is provided for manufacturing an unrefined phosphate rock containing slurry fertilizer having a rheology such that the fertilizer can be sprayed directly onto cropland. In the process, the phosphate rock is acidulated and ammoniated while the fluid content of the reaction mixture is maintained at a level that will keep the mass continuously fluid. At least 50% of the acidulating medium's acidulating value comes from 40–50% concentration sulfuric acid. As used herein all percentages are by weight. At least 1 mole of excess sulfuric acid is used per mole of $P_2O_5$ in phosphate rock, this being in excess of the amount of acid required to convert the $P_2O_5$ in the phosphate rock to monocalcium phosphate.

In preferred embodiments the sulfuric acid is added in an amount of at least about 12 units of $SO_4$ from sulfuric acid per 6 units of $P_2O_5$ from rock. Moreover the water content of the acidulate is maintained between 20–45%, more preferably 30–40%. The term "unit" means 20 pounds of a given nutrient or one percent of that nutrient in a ton of fertilizer. See Kirk-Othmer, Encyclopedia of Chemical Technology, volume 9, page 40. Sufficient ammonia is added to the acidulate to raise the pH above 3, more preferably to 5.0–5.5 and additional ammonia and phosphoric acid are added subsequent to the attainment of a pH of 5.0–5.5 in a ratio of about 4 pounds of 52–54% phosphoric acid per pound of ammonia.

In other preferred embodiments, the acidulation acid includes about 5.5% $P_2O_5$ equivalent of phosphoric acid (on a wet process 54% phosphoric acid basis). From 0.05 to 0.20% boron is added to the mass on an end product weight basis. From 0.15 to 0.45% of magnesium is added to the mass on an end product weight basis. At least 20% of the total phosphoric acid used on an end product basis is charged to the reaction zone before the sulfuric acid is charged to the reaction zone. The phosphate rock is mixed with water prior to the addition of the sulfuric acid. About .10 gram $P_2O_5$ equivalent of phosphoric acid is charged to the reaction zone per gram of 40–50% concentration sulfuric acid before any sulfuric acid is charged into the reaction zone.

In further preferred embodiments, the phosphate rock is acidulated with phosphoric acid and subsequently acidulated by sulfuric acid. From about 1.5 to 2.0 units of ammonia are added to the phosphoric acid-phosphate rock acidulate per 2000 pounds of end product before the sulfuric acid is added.

By another aspect of this invention a slurry fertilizer is produced having from 95 to 98% of its total phosphate in plant available form, 85 to 95% of the phosphate derived from phosphate rock in plant available form, from 90 to 95% of the plant available phosphate in water soluble form, containing all of the impurities introduced with the original phosphate rock and from 4.50 to 4.75% sulfur.

In preferred forms the slurry fertilizer has a boron content of 0.05 to 0.2% and a clay content of 0.75 to 1.50%. The slurry fertilizer has a sodium salt of sulfonated oleic acid content of 0.1 to 0.2%. The slurry fertilizer in a preferred form has a boron content of 0.05 to 0.20% and a magnesium content of 0.10 to 0.50. The slurry fertilizer has an N to $P_2O_5$ plant nutrient ratio of 1–3.

Further aspects of the present invention will become apparent hereinafter and the specification concludes with claims particularly pointing out and distinctly claiming the subject matter which we regard as our invention. The invention, however, as to organization and method of operation, together with other objects and advantages thereof, may best be understood by reference to the following description.

The term "slurry fertilizer" as used herein designates a fertilizer that is a liquid suspension. Generally, the slurry contains nutrients in finely divided solid form and in solution. The slurry fertilizer also contains other substances that have been added to aid in the processing of the slurry and to improve the chemical and physical properties of the slurry fertilizers. Other active and inert substances may also be present as by-products or by reason of deliberate addition.

The following abbreviations have been used in this application. The use of three numbers separated by hyphens, e.g., 7-21-0, 5-15-5, and so on, refers to the respective percentage contents of nitrogen (as N), phosphorus (as $P_2O_5$), and potassium (as $K_2O$). While nitrogen is expressed as N, phosphorus as $P_2O_5$ and potassium as $K_2O$, the elements may actually be present in other chemical forms. Such abbreviations are well known to the fertilizer industry. TPA represents the total phosphoric anhydride as $P_2O_5$ and APA represents available phosphoric anhydride as $P_2O_5$ which is the citrate soluble portion of the total phosphate. The citrate soluble portion of the phosphate is the portion which is regarded as the amount of phosphate available to the plant. CI represents the citrate insoluble phosphorus as $P_2O_5$.

It has been found that when practicing the process of this invention, if the sulfuric acid concentration is outside of a concentration range of about 35–50%, the reaction mixture will set up to a solid during ammoniation and prevent the production of a satisfactory high analysis slurry fertilizer; provided, however, that if phosphoric acid is present, then the sulfuric acid concentration should be within the range 40–50%, as otherwise the reaction mixture will set up to a solid during ammoniation. An independent controlling factor on liquidity has been found to be a requirement that the sulfuric acid content be at least about 12 units of $SO_4$ per 6 units of $P_2O_5$ from phosphate rock. The preferred rate of sulfuric acid addition is 12–14 units of $SO_4$ per 6 units of $P_2O_5$ from phosphate rock, i.e., a weight ratio of 2–2.3:1, $SO_4:P_2O_5$. These two factors, i.e., concentration and total acid content, have been found to be independent limitations on the process if a slurry is to be the product.

Sulfuric acid needs to be used at the rate (i.e., ratio) of only about 8 units of $SO_4$ per 6 units of $P_2O_5$ from rock for complete conversion of the rock. However, because such a mix will set up during ammoniation, the higher sulfuric acid rate must be used. As the sulfuric acid rate increases above the 8-unit level, the total acidulation effect of the acid actually decreases in the system of this invention. In other words, there is a slight loss in conversion when sulfuric acid is used at the rate of 12 units of $SO_4$ per 6 units of $P_2O_5$ from phosphate rock as compared to using sulfuric acid at the rate of only 8 units of $SO_4$ per 6 units of $P_2O_5$ from rock.

It has been also found that during ammoniation the water content will be between 25 and 40%, more preferably 28 and 32%, during at least a portion of the ammoniation. On a different basis the water content of the acidulate should be between 20 and 45%, more preferable 30 and 40%, if thick stage difficulty is to be avoided during ammoniation. If the water content falls below or rises above these ranges the reaction mass tends to set up during ammoniation, if substantially adiabatic processing is to be used. With no cooling, the temperature of the reaction mass rises to boiling, about 220 to 250° F., shortly after ammoniation begins. The thick stage problem is particularly critical at a pH of about 4–4.5.

The sulfuric acid concentration that is used to acidulate the phosphate rock is between about 35 and 50% as previously stated. This sulfuric acid concentration is exceedingly corrosive. 40% sulfuric acid, which is the preferred concentration in this process, has been observed to be so corrosive to 304 and 316 stainless steel, that it actually blackened the stainless steel within only a few minutes exposure time. Substantial corrosion damage has been observed when 40% sulfuric acid was charged into a 316 stainless steel reactor vessel and phosphate rock added afterwards.

It has been discovered that if water is charged to the stainless steel reaction vessel first and the phosphate rock is slurried into the water before the sulfuric acid is added, corrosion is no longer readily observable having been inhibited by the order of addition. Of course, when water and phosphate rock are added to the reactor reaction first the sulfuric acid used must be sufficiently concentrated to constitute the proper 40–50% sulfuric acid concentration after dilution with the water. In the usual instance, the ordinary commercial 66° Bé. (93%) $H_2SO_4$ is used and diluted with water to form the 40–50% sulfuric acid. It has also been discovered that if the process of this invention is carried out in a steel reactor, the reactor will not be visibly damaged when the sulfuric acid is added before the phosphate rock if .10 gram $P_2O_5$ equivalent of phosphoric acid is added per gram of 40–50% concentration sulfuric acid before the sulfuric acid. This procedure has prevented reactor damage at operating temperatures of about 250° F.

Therefore, in practicing the process in its simplest form sufficient formula water is charged into a reactor to suspend the desired quantity of phosphate rock under conditions of heavy agitation. The phosphate rock is then added to the water with continuous heavy agitation. After this sulfuric acid is added to the phosphate rock-water mixture in a concentration and amount that will provide 12–14 units of $SO_4$ per 6 units of $P_2O_5$ and a sulfuric acid concentration of 40–50% after dilution with the water but excluding the phosphate rock from the concentration calculation. The reaction mixture thus formed should be allowed to acidulate for about 10 minutes.

While the phosphate rock need not be sized, it has been found that phosphate rock that passed 100% through 30 mesh and about 60–70% through 200 mesh U.S. Standard screen is readily acidulated by the acid in the short span of about 10–20 minutes. Larger sized phosphate rock would require additional acidulation time.

After acidulation neutralization is begun by the addition of anhydrous ammonia at the maximum rate at which it can be absorbed into the acidulate. A preferred ammoniation rate has been found to be 2.5 pounds of ammonia per ton of slurry product per minute.

During ammoniation using this procedure, the reaction mixture tends toward a heavy thick consistency. The citrate insoluble phosphate content tends to be high in the end product. Supplemental cooling reduces corrosion, and aids processing fluidity. It was generally found necessary to hold the temperature below about 130° F. to obtain really good results. However, supplemental cooling is usually expensive on a commercial basis. The highest analysis slurry fertilizer that can be obtained by the procedure is about 3–5% total nitrogen and 10–12% available phosphorus computed as $P_2O_5$ as is usual in the fertilizer industry. Higher rates of nutrient materials cause the slurry to set up.

It has been found that if phosphoric acid is included in the acidulate in an amount of about 5.5% $P_2O_5$ equivalent, the fluidity would be so greatly improved that no significant thickening occurred. The best procedure is to add the water and phosphoric acid to the reactor first, to protect the reactor from corrosion and thereafter add the sulfuric acid. The phosphate rock is then added to the acid-water mixture and allowed to acidulate for about 20 minutes. In calculating the 40–50% sulfuric acid concentration, the phosphoric acid (including the water in the phosphoric acid) is not counted, just as the phosphate rock was not counted in the previously described procedure. The water added as water is, however, counted in computing the sulfuric acid concentration.

The phosphoric acid adds acidulating value, but the acidulation value is not very useful because it is still necessary to add the 12 units of sulfuric acid on an $SO_4$ basis per 6 units of $P_2O_5$ from phosphate rock. Thus a large excess of sulfuric acid acidulation value is already available. The phosphoric acid does, however, contribute valuable phosphate to the slurry fertilizer which raises the analysis of the fertilizer. Of course, the phosphoric acid is of key importance in providing process fluidity during ammoniation.

After acidulation ammoniation can be begun by adding ammonia at the rate of about 2.5 grams of ammonia per 2000 grams of end product slurry. Ammoniation can be continued until the pH reaches about 5.0–5.5. If ammoniation proceeds much beyond a pH of about 5.5, the reaction mixture tends to set up.

About the maximum analysis that can be obtained using a 5.5% phosphoric acid in the acidulate is about 5-15-0.

If a higher phosphorus and nitrogen analysis is desired in the final fertilizer than can be achieved by the acidulation of the phosphate rock and the addition of about 5.5 to 7.5% $P_2O_5$ equivalent of the phosphoric acid, then it has been found preferable to add phosphoric acid and ammonia to the reaction mixture simultaneously after the pH of the reaction mixture reaches 5.0 to 5.5. This method of adding the additional nutrient materials provides a much more fluid mass during ammoniation than is achieved if all of the phosphoric acid is added before ammoniation begins.

Thus, to produce a 7-21-0 slurry mix fertilizer as in Example 1, 110 pounds of ammonia and 430 pounds of phosphoric acid are added in approximately 20 minutes in a ratio of about 1 to 4. This procedure constitutes the second phase of the process.

If the product is to have suitable storage characteristics either the pH of the final product should be maintained below 5.5 or boron should be added in an amount of 0.05 to 0.20% on an end product weight basis. If these procedural steps are not taken, the product has been found to have a strong tendency to set up after only a short storage period. The product has been found in many cases to set up in storage within a matter of hours. The boron can be added at any time before the pH of the reaction mixture reaches 5.5, so long as sufficient time is allowed for a good dispersal of the boron in the reaction mixture. The boron can be added in a form such as boric acid or borax. When boron can be used in amounts of from .05 to .2% on an end product basis and additional ammonia and phosphoric acid can be added simultaneously in a manner maintaining the pH between about 5.0 to 5.5, the product yielded has been found to exhibit better storage properties than when either procedure is used alone.

Several suspending aids have also been found helpful during storage. It has been found that a surface active agent such as the sodium salt of sulfonated oleic acid when added at rates of about 2-4 grams per 2000 grams of finished product helps to improve rheology by increasing fluidity. "Attagel 150" suspending clay has also been found to improve the suspension properties of the slurry when added at rates of about 10 grams to 30 grams per 2000 grams on an end product basis.

During the research leading to the development of the foregoing procedure, several other procedures within the purview of this invention were developed that can serve as alternative, albeit less statisfactory, processes.

In one of these alternative processes for producing a high analysis, 7-21-0 slurry fertilizer using sulfuric acid as the major acidulating agent, the total amount of phosphoric acid needed to make grade is initially added to the reactor together with the formula water. The desired quantity of phosphate rock is then mixed into the phosphoric acid-water mixture. The formula water must be in sufficient quantity to provide sufficient fluidity in the phosphoric acid-water mixture to disperse the desired quantity of phosphate rock in suspension under condition of heavy agitation.

The mass is allowed to acidulate for 10 minutes after the completion of the phosphate rock addition. After this sulfuric acid is added to the acidulate in the quantities and at the concentration previously discussed as being necessary. That is, sulfuric acid is added in a quantity sufficient to supply 12 units of $SO_4$ from sulfuric acid per 6 units of $P_2O_5$ from rock and in a concentration of 40–50%. The mass is then allowed to acidulate for another 20 minutes.

Then ammoniation is begun at the rate of 4 grams of ammonia per minute per 2000 pounds of product. It is often necessary to reduce the ammoniation rate because of ammonia blow by. Ammoniation can be continued until a pH of 5.0–5.5 is reached. If ammoniation is carried beyond about 5.5, the reaction mixture will tend to set up. The mass tends to be very thick during ammoniation, particularly when the pH is between about 4.5 and 5.0.

A more preferred process involves adding the phosphoric acid to the water and the phosphate rock to the phosphoric acid-water mixture as described in the previous paragraph. Then after the 10 minute acidulation period, about 1.5 units of ammonia are added. The sulfuric acid is added after this partial ammoniation and the mass is allowed to acidulate for about 10 more minutes. Then about 7.2 units of ammonia are added. The final quantity of ammonia may vary depending on the final fertilizer analysis desired. This procedure which involves partial neutralization gives good fluidity but slightly decreased end product conversion of the phosphate rock to plant available phosphorus.

While these last two procedures were found to be workable, it was felt that they were not very satisfactory commercial procedures because they exhibited substantial thick stage problems making processing difficult. The procedure wherein some ammonia is added before the sulfuric acid reduced conversion somewhat while aiding fluidity. In neither procedure can the pH be raised above about 5.5 without a strong tendency of the product to set up almost immediately after processing.

Lower analysis slurry fertilizers process more easily and store better than the slurry fertilizers having higher analysis. It is the high analysis 7-21-0 slurry fertilizer that presents the greatest processing and storage problem using these procedures.

It has been found that the addition of 0.05 to 0.2% boron, on an end product basis, to the reaction mixture before the pH rises above about 4 will reduce the thick stage to such an extent that ammoniation can be continued to a pH of 5.0 to 5.5, when at least about 5.5% $P_2O_5$ equivalents of phosphoric acid are included in the acidulate. To reduce corrosion, the phosphoric acid and water should, of course, be charged into the reaction zone ahead of the sulfuric acid. When 5.5 $P_2O_5$ equivalents of phosphoric acid are included, the boron will greatly aid fluidity during ammoniation when added before the pH of the reaction mixture reaches about 4. Of course, the boron must be added a sufficient time before the pH reaches 4 to allow for its distribution throughout the mass.

It has further been found that if from 0.15 to 0.45% of magnesium, in a form such as magnesium oxide, is added with the boron, fluidity is further improved. The magnesium does not appear to have a beneficial fluidizing effect by itself but acts in some manner to make the boron more effective.

The slurry fertilizer product produced by the process of this invention has an unexpectedly high portion of its phosphorus in water soluble form. From 90 to 95% of the available phosphorus is in water soluble form. From 90 to 95% of its total phosphorus is in plant available form. Substantially all of the impurities introduced with the phosphate rock are included in the slurry fertilizer. The sulfur content is about 4.50 to 4.75%. In those instances where boron is used the slurry fertilizer has a boron content of 0.05–20%. When magnesium is used, the slurry fertilizer has a magnesium content of 0.10 to 0.50%. Slurries containing attagel suspending clay have an attagel suspending clay content of 0.50 to 1.50%. The slurry fertilizer has a sodium salt of sulfonated oleic acid content of 0.1 to 0.2% when the sodium salt of oleic acid is added as a suspension and dispersion aid The following examples describe without limiting the invention:

EXAMPLE 1

A 7-21-0 slurry fertilizer was prepared in the laboratory in the manner described below. The following apparatus was used. A 4-liter resin kettle reactor equipped with a 3-inch turbine agitator blade, an automatic anhydrous ammonia dispensing unit terminating in a sparger tube discharging under the agitator blade, and inlets for solids and acids entering through the kettle's top.

The procedure used for preparing the 7-21-0 was as follows. 410 grams of water was added to the reactor and the agitator was turned on. Then 133 grams of 52% wet process phosphoric acid was added to the reactor. The phosphoric acid was obtained from the Davison Division of W. R. Grace & Co. After the phosphoric acid was thoroughly mixed with the water during a period of about one half minute, 307 grams of 93% sulfuric acid were added to the reactor. Then 368 grams of phosphate rock was added to the reactor over about 5 minutes at a substantially even rate. The phosphate rock was 75 BPL Florida Phosphate Rock obtained from the Davison Division of W. R. Grace & Co. The rock was 100% through 30 mesh and about 60–70% through 200 mesh U.S. Standard screen size.

The reaction mixture was allowed to acidulate for 20 minutes after the completion of the rock addition. Then ammoniation was begun at the rate of 2.5 grams of ammonia per 2000 grams of end product slurry per minute until 72 grams of ammonia had been added, at which time the pH was about 5.0 to 5.5. This required about 30 minutes.

The analysis at this juncture in the process was about TN 5%; 16.4% TPA; 15.0% APA; 1.4% Cl; 30.7% $H_2O$.

After the above ammoniation period, a second phase of operation was carried out in the same reactor 225 grams of water was added. 102 grams of ammonia and 457 grams of phosphoric acid were added simultaneously at substantially even rates over a 20 minute period. After this, about 90 grams of make up water was added per 2000 grams of slurry to bring the batch up to analysis.

The analysis of the slurry was found to be 7.04% TN; 21.55% TPA; 20.95% APA; 0.60% Cl; 28.0% $H_2O$.

The rheology was observed to be good. The product was observed to store satisfactorily for more than two months. The precipitate that settled was soft and easily redispersed by agitation. During the two-month storage period the pH was found to be stable within a few tenths of a pH unit.

EXAMPLE 2

200 grams of a 7-21-0 slurry fertilizer of the type produced in Example 1 was placed in the resin kettle of Example 1. 23.3 grams of potassium chloride and 56.7 grams of water were cold blended with the 7-21-0 slurry fertilizer in the resin kettle to produce a 5-15-5 fertilizer.

The 5-15-5 slurry fertilizer was analysed and found to actually be 4.93–15.27–5.51. The rheology was excellent and the pH of 5.7 remained relatively stable for 75 days.

EXAMPLE 3

590 grams of the phosphoric acid of Example 1 and 410 grams of water were added to the reactor of Example 1 and the agitator was turned on. Then 367 grams of the phosphate rock of Example 1 was charged into the reactor at a substantially constant rate over a period of about five minutes. The thus formed mass was allowed to acidulate for about ten minutes after which 307 grams of the sulfuric acid of Example 1 was added. The mass was then allowed to acidulate for about 20 minutes. The water content was about 32%. Then 150 grams of anhydrous ammonia was sparged into the mass at the rate of 4.0 grams of ammonia per minute per 2000 grams of end product slurry fertilizer. After 80 to 85% of the ammonia had been added to the mass, the water content was about 21% and 250 grams of water was added bringing the water content to 32%. Ammoniation was continued after the water was added but the rate was reduced to 2.5 grams of ammonia per minute per 2000 pounds of end product. After the completion of the ammoniation phase, 122 grams of make up water were added to adjust the analysis of 7-21-0.

The analysis of the slurry product produced was 7.26% TN; 22.70% TPA; 22.22% APA; 0.48% Cl. The pH was about 6.0 and the rheology was observed to be fair.

EXAMPLE 4

A 7-21-0 slurry fertilizer was produced substantially as in Example 3 except 35 grams of the ammonia was added immediately before the sulfuric acid at the rate of 2.5 grams of ammonia per minute per 2000 grams of end product. After the sulfuric acid addition and a 10-minute additional acidulation period, the balance of the ammonia was added at the 2.5-gram rate. 250 grams of water were added after about 75% of the ammonia had been added. The water content at the beginning of the first ammoniation period was about 37%; at the beginning of the second ammoniation period about 32%; before the additional water was added, about 21%; and after ammoniation, about 35%.

The analysis of the slurry fertilizer product was found to be 6.48% TN; 22.40% TPA; 22.00% APA; 0.40% Cl. The pH was about 6.0.

EXAMPLE 5

A 7-21-0 slurry fertilizer was produced substantially as in Example 4 except 40 grams of boric acid were added immediately before the beginning of the second ammoniation period began.

The analysis of the slurry product produced was 7.26% TN; 22.70% TPA; 22.22% APA; 0.48% Cl. The pH was about 6.0 and the rheology was observed to be relatively good.

EXAMPLE 6

A 7-21-0 slurry fertilizer was produced substantially as in Example 3 except 10 grams of magnesium oxide was added 10 minutes after the sulfuric acid and the boric acid was not added until after about 52% of the total ammonia had been added. 250 grams of make up water was added after the completion of the ammonia addition.

The analysis of the slurry fertilizer product was found to be 7.18% TN; 22.50% TPA; 21.82% APA; 0.68% Cl. The pH was about 7.0. The processing rheology was superior to that in Example 3 being free of thick stages, and the storage characteristics after several months were observed to be better, exhibiting good suspension characteristics and little thickening having occurred.

EXAMPLE 7

To a slurry fertilizer of the type produced in Example 1, three pounds of the sodium salt of sulfonated oleic acid was added just before the slurry fertilizer was removed from the reactor. The slurry fertilizer was observed to have superior storage characteristics and improved fluidity.

EXAMPLE 8

To a slurry fertilizer of the type produced in Example 1, 25 grams of "Attagel 150" suspending clay was added per 2000 grams of slurry, just prior to the end of the ammonia addition. The slurry fertilizer was observed to have superior storage characteristics with improved suspension characteristics.

EXAMPLE 9

716 grams of water was charged to the reactor in Example 1 and the agitator was turned on. Then 642 grams of the phosphate rock of Example 1 was charged into the reactor at a substantially constant rate over about a five-minute period. Next 520 grams of the sulfuric acid of Example 1 was charged into the reactor and the mass was allowed to acidulate for about ten minutes. After acidulation, 122 grams of anhydrous ammonia was charged into the reactor at rate of 3 grams per minute per 2000 grams of end product slurry. No cooling was employed during processing and the temperature of the batch rose to about 200° F. during acidulation and about 225° F. during the ammoniation period.

The product analysed 5.0% TN; 11.0% TPA; 1.0% Cl; 10.0% APA; and had a pH of about 7.

EXAMPLE 10

711 grams of water was charged to the reactor of Example 1 and the agitator was turned on. Then 639 grams of the phosphate rock of Example 1 was charged to the reactor at a substantially constant rate over about a five-minute period. Next 485 grams of the sulfuric acid of Example 1 was charged to the reactor and after this an acidulation period of about ten minutes was allowed. After acidulation, 78 grams of anhydrous ammonia was added to the reaction mass at the rate of about 2 grams per minute per 2000 grams of end product. After this, 87 grams of water was added to bring the batch to the 2000-gram final batch weight. Cooling means were used to keep the batch temperature at about 150 to 160° F. during acidulation and about 110° F. during ammoniation.

The slurry fertilizer product analysed 3.20% TN; 11.0% TPA; 10.00% APA; 1.00% Cl; and had a pH of about 5.3.

EXAMPLE 11

To verify the effect that the order of adding the ingredients in the system of this invention has on the corrosion of equipment, the following two procedures were carried out:

Procedure A 500 milliliters of water were added to a 4000-milliliter beaker. Next 2 pieces of approximately 1 inch long and ¼-inch diameter 304 stainless steel tubing were placed in the beaker. After this, 520 grams of 96% sulfuric acid were added to the beaker. Next 588 grams of the same phosphate rock described in Example 1 was added to the beaker. It required a period of two minutes for the addition of the water, the stainless steel pieces and the sulfuric acid to the beaker. An additional two minutes was required for the addition of the phosphate rock. Thorough mixing was applied to the mixture after each ingredient was added to insure homogeneity of the mixture. Ten minutes was allowed for the reaction of the sulfuric acid and the phosphate rock. The slurry was then discarded and the stainless steel tubes were thoroughly washed with water. The stainless steel tubes were found to be black and heavily pitted and corroded.

Procedure B 500 milliliters of water was added to a 4000-milliliter beaker after which two pieces of approximately 1 inch long and ¼-inch diameter 304 stainless steel tubing were placed in the beaker. Next 588 grams of the same phosphate rock described in Example 1 was added to the beaker with thorough mixing. After this 520 grams of 96% $H_2SO_4$ was added to the beaker and mixed to insure homogeneity of the mixture. About three minutes were required to place the water, the stainless steel pieces and the phosphate rock in the beaker. About one minute was required for the addition of the sulfuric acid. Ten minutes reaction time was allowed and the slurry was then discarded and the stainless steel tubes were thoroughly washed with water. The stainless steel tubes showed no signs of visual corrosion.

While in accordance with the patent statutes, the foregoing specification describes the invention in considerable detail with a number of specific embodiments having been referred to for purposes of illustration, it will be apparent to those skilled in the art that the invention is susceptible to additional embodiments and that many of the details described can be varied considerably without departing from the essence and scope of the invention.

We claim:

1. In the method of producing a slurry fertilizer by steps including reacting phosphate rock with phosphoric and sulfuric acids as the sole acids followed by ammoniation with anhydrous liquid ammonia, the improvement comprising:
(a) first forming a mixture of the phosphate rock of a particle size to pass a 30-mesh U.S. Standard screen, water, and phosphoric acid in the amount of at least 0.1 gram of the $P_2O_5$ equivalent of 52–54% wet process phosphoric acid per gram of 40–50% concentration sulfuric acid applied subsequently in the process, the amount of phosphoric acid added being at least 20% of the total supplied in the process, and permitting the mixture to react for several minutes;
(b) then adding any remaining wet process 52–54% phosphoric acid with the sulfuric acid, the sulfuric acid content taken with the water in the admixture, exclusive of the water in the phosphoric acid, providing a sulfuric acid concentration of 40–50%, and the weight ratio of the $SO_4$ in the sulfuric acid to $P_2O_5$ in the phosphate rock being 2–2.3:1, while the total phosphoric acid added including that supplied in step (a) is in the amount of 5.5–7.5% $P_2O_5$ equivalent, based on the total mixture;
(c) thereafter permitting the acidulation of the phosphate rock to be completed while maintaining the water content of the acidulent mixture at 20–45%; and
(d) then while maintaining the water content of the acidulent mixture of (c) between 25–40%, adding anhydrous ammonia at substantially the maximum rate at which it can be absorbed and at a temperature of up to 250° F. until the pH is in the range of about 5.0–5.5, the water of the reaction mixture being maintained to provide 30–40 weight percent in the slurry product.

2. The method in accordance with claim 1 in which 0.05–0.20 percent of a member selected from the group consisting of boric acid and borax, on an end product weight basis, is added to the slurry to further improve its suspension characteristics.

3. The method in accordance with claim 2 in which 0.10–0.50 percent by weight of magnesium oxide, on an end product weight basis, is added to the slurry to further improve its suspension characteristics.

4. The method according to claim 1 in which 0.1–0.2 percent of the sodium salt of sulfonated oleic acid on an end product weight basis, is added to the slurry to further improve its suspension characteristics.

References Cited

UNITED STATES PATENTS

| | | | |
|---|---|---|---|
| 1,610,362 | 12/1926 | Coslett | 148—6.15 XR |
| 2,786,746 | 3/1957 | Goldhaar | 71—39 XR |
| 2,869,997 | 1/1959 | Atkin | 71—40 |
| 2,890,936 | 6/1959 | Benefield | 71—40 XR |
| 2,913,329 | 11/1959 | Geiersberger et al. | 71—43 XR |
| 3,050,384 | 8/1962 | Bigot | 71—43 XR |
| 3,091,523 | 5/1963 | Smith et al. | 71—43 XR |
| 3,234,005 | 2/1966 | Smalter et al. | 71—29 |
| 3,397,955 | 8/1968 | Champ et al. | |

FOREIGN PATENTS

| | | |
|---|---|---|
| 951,476 | 3/1964 | Great Britain. |

REUBEN FRIEDMAN, Primary Examiner

B. H. LEVENSON, Assistant Examiner

U.S. Cl. X.R.

71—40, 41, 43, 34